United States Patent [19]

Sinnige

[11] Patent Number: 5,968,237
[45] Date of Patent: Oct. 19, 1999

[54] WAX EMULSION COMPOSITION FOR IMPARTING WATER REPELLENCY TO GYPSUM

[75] Inventor: Laurence Anthony Sinnige, Niagara Falls, Canada

[73] Assignee: Walker Industries Holdings Limited, Ontario, Canada

[21] Appl. No.: 09/003,471

[22] Filed: Jan. 5, 1998

[30] Foreign Application Priority Data

Jan. 6, 1997 [GB] United Kingdom .................... 9700372

[51] Int. Cl.$^6$ .................................................. C09D 191/06
[52] U.S. Cl. .............................. 106/2; 106/271; 524/487; 524/489; 252/311; 385/2; 385/16
[58] Field of Search ........................ 106/2, 271; 524/487, 524/489; 252/311; 585/2, 16

[56] References Cited

U.S. PATENT DOCUMENTS

| | | | |
|---|---|---|---|
| 3,649,319 | 3/1972 | Smith | 106/111 |
| 3,935,021 | 1/1976 | Greve et al. | 106/111 |
| 4,042,409 | 8/1977 | Terada et al. | 106/111 |
| 4,094,694 | 6/1978 | Long | 106/111 |
| 4,140,536 | 2/1979 | Maier et al | 106/116 |
| 4,421,704 | 12/1983 | Reily | 264/133 |
| 4,748,196 | 5/1988 | Kuroda et al. | 524/43 |
| 5,098,943 | 3/1992 | Tagawa et al | 524/423 |
| 5,120,355 | 6/1992 | Imai | 106/2 |
| 5,437,722 | 8/1995 | Borenstein | 106/270 |

FOREIGN PATENT DOCUMENTS 2205562 12/1988 United Kingdom .

*Primary Examiner*—C. Melissa Koslow
*Attorney, Agent, or Firm*—Finnegan, Henderson, Farabow, Garrett & Dunner, L.L.P.

[57] ABSTRACT

A water-based wax emulsion formulation for imparting water repellent characteristics to gypsum wall boards comprising: (a) hydrocarbon wax; (b) an alkyl acid and/or alkyl ester; and (c) a polyvinyl alcohol composition comprising partially and/or fully hydrolyzed polyvinyl acetate. The formulation may also contains other ancillary components such as emulsifiers and stabilizers.

21 Claims, No Drawings

WAX EMULSION COMPOSITION FOR IMPARTING WATER REPELLENCY TO GYPSUM

BACKGROUND OF THE INVENTION

1. Field of the Invention

This invention relates to a composition and method of manufacture of an aqueous wax emulsion and its use in the production of water-resistant gypsum products such as water-resistant gypsum board or panels 2. Description of the Prior Art The production of gypsum based materials involves a mixture of calcium sulphate hemihydrate with water. The mixture is allowed to hydrate or set to the much harder calcium sulphate dihydrate and the excess water is removed by drying through conventional methods. Gypsum products such as wallboard panels are produced from a hardened gypsum core sandwiched between a set of paper liners which represent the outside surfaces of the wallboard. To overcome problems of water absorption by the hygroscopic gypsum which then weakens the wallboard, other additives such as asphalt-wax emulsions, wax emulsions and polyvinyl alcohols were incorporated with the gypsum in order to produce a water-resistant wallboard.

Some of the problems associated with the known wax emulsions are as follows:

1. Wax-asphalt emulsions are generally unstable—that is, the emulsion tends to separate over time into a liquid phase and a solid crust floating on top. The crust is not easily re-emulsified with mixing and can form lumps in the mix. When the board is produced, the un-emulsified asphalt component bleeds out of the set gypsum core and shows up as black spots on the paper liners.
2. The wax-asphalt is black because of the asphalt component which makes the gypsum core in the final board product off-colour.
3. Asphalt from crude petroleum refining processes can vary in properties and therefore increase the variability in emulsion usage, end-product quality and wallboard manufacturing.
4. Other wax substitutes, such as montan or lignite, while providing good water repellency, are known to cause a buildup of dark or black sludge in process tanks used for emulsification.
5. Many wax emulsions based on montan or other natural or synthetic ester waxes, while they are more readily re-mixed than asphalt wax emulsions, still tend to separate during storage. This separation or "creaming" effect results in inconsistent performance characteristics.
6. Emulsions based exclusively on fatty acids or other alkyl acids, while providing superior storage properties and water repellency, have an adverse effect on the gypsum slurry.

A wax emulsion formulation is proposed in U.S. Pat. No. 5,437,722 wherein the formulation consists of a paraffinic hydrocarbon, montan wax and polyvinyl alcohol. Although providing some water repellency to the gypsum wallboard there are deficiencies in such formulation due to the crude nature of the montan wax which is a product containing a variety of components. For this reason, it results in discoloration of the resulting emulsion and fouling of the handling equipment. Further, the quality of the emulsion formulations using montan wax is variable since the composition of such component is not consistent.

Therefore, the present invention seeks to provide a wax emulsion which:

1. Allows for the use of water-repellent materials in the emulsion product.
2. Allows for the substitution of the wax-asphalt component with a compound which does not produce an off-colour gypsum wallboard.
3. Allows use of substitutes for asphalt with improved consistency of properties and performance.
4. Allows use of substitutes for montan wax with improved consistency of properties and performance
5. Provides an emulsion of improved stability over asphalt-based emulsions.
6. Provides an emulsion of improved stability over existing wax emulsions.
7. Results in process equipment with lower maintenance and cleanup procedures.

SUMMARY OF THE INVENTION

The present invention provides a wax emulsion which overcomes the deficiencies in the known formulations. Specifically, the invention provides, in one embodiment, an aqueous emulsion consisting of water and the following components: a) hydrocarbon wax; b) an alkyl acid and/or alkyl ester present in the range of from 0.1 to 50 parts per 100 parts wax; and c) a polyvinyl alcohol composition comprising partially and/or fully hydrolyzed polyvinyl acetate present in the range of from 0.5 to 50 parts per 100 parts wax. The formulation may also contain other known ancillary components.

In another aspect, the present invention provides a method for the production of a water-based wax emulsion comprising the steps of:

(i) blending a hydrocarbon wax and an alkyl acid and/or alkyl ester in a molten state to form a wax blend;
(ii) solubilizing polyvinyl alcohol in water to form an aqueous solution;
(iii) mixing the wax blend and the aqueous solution at a temperature above the melt point of the wax blend to form an emulsion; and
(iv) cooling the emulsion to form a stable wax emulsion.

DESCRIPTION OF THE PREFERRED EMBODIMENTS

For the above noted composition of the invention, the component (a) may consist of a hydrocarbon wax having a melt point in the range of 40–110° C. Below this temperature the water repellency of the board may suffer when exposed to warm or hot conditions; above this temperature the wax becomes difficult to emulsify under atmospheric pressure. More specifically, the hydrocarbon wax is generally a petroleum fraction wax, either paraffin or microcrystalline, and may be either in the form of slack or scale waxes, or refined waxes of varying degrees. Synthetic waxes such as ethylenic polymers or hydrocarbon type via Fischer-Tropsch synthesis may be used as well.

The component (b) comprises an alkyl acid and/or alkyl ester where both could be derived from a high molecular weight fatty acid of synthetic or natural sources.

Alkyl acids and carboxylic acids are represented by the general formula R—COOH, where R represents the alkyl non-polar group which is lipophilic and can range from 18 to more than 200 carbon atoms in length. The COOH group is the acid function which forms hydrophilic polar salts in the presence of alkali metals such as sodium or potassium present in the emulsion. When these alkyl acids are in solution in the continuous aqueous phase they will be adsorbed onto the surface of the hydrocarbon wax particles, providing stability to the emulsion. When the hydrophilic emulsion is mixed with a calcium slurry, the negatively charged wax particles are attracted to the electropositive $Ca^{2+}$ ions and form insoluble calcium salts, thereby transforming the character of the wax particles from hydrophilic to hydrophobic.

Esterified products of the alkyl acids with alcohols or glycols may also be added to the stucco. The ester functions may be represented by the formula RCOOCR or $RCOOCH_2CH_2COOCR$. Since the ester components do not have acid functions to react with the alkali metals such as sodium and potassium in the emulsion, they do not participate in stabilizing the emulsion. Further, they do not react immediately with the calcium slurry. They do, however, provide excellent water repellency to the finished product.

Preferably, the alkyl acid and/or alkyl ester are derived from a high molecular weight fatty acid of synthetic or natural source and have a carbon chain length greater than $C_{18}$. Below this level the emulsion becomes unstable to the gypsum slurry. The preferred length of this component would be one having a carbon chain length of $C_{26}$ to $C_{46}$. The alkyl acid, which can be a mono-, di-, or multi-acid, may be partially or fully esterified using mono or di-functional alcohols, glycerols or other polyfunctional alcohols in order to provide esters of even higher molecular weight. The concentrations of the alkyl acid and ester can be adjusted to provide specific acid and ester values. In this way the formula can be adjusted to provide maximum stability and water repellency without adversely affecting the fluidity of the gypsum stucco. For the purpose of demonstration the alkyl acid will consist essentially of octacosanoic acid and the ester will be essentially a di-ester of said alkyl acid with ethylene glycol. In the following examples, the ratio of these components will be varied to demonstrate the effects described above.

Although details of the present invention will be described with reference to octacosanoic acid and esters, it is contemplated that a wide variety of alkyl acids and esters may be utilized. Examples of suitable alkyl acids/esters include the UNICID™ line of carboxylic acids produced by Petrolite Corporation Polymers Division, Tulsa, Okla., USA; the SAFACID™ line of saturated and unsaturated acids and esters produced by Pronova Oleochemicals, Sandefjord, Norway; the A-CT™ and ACumist™ line of homopolymers, copolymers and micronized polyethylene waxes produced by Allied Signal Inc., Performance Additives, Morris Town, N.J., USA; and the KESTER™ line of waxes produced by Koster Keunen, Inc., Watertown, Conn., USA. As stated above, preferably, the alkyl acids and esters have a carbon chain length greater than $C_{18}$.

As will be shown by the test described below, manipulation of the alkyl acids and corresponding esters provides an emulsion with excellent stability and performance which can be tailored to suit varying stucco sources and production plant conditions.

The polyvinyl alcohol of component (c) includes any grade of partially and/or fully hydrolyzed polyvinyl acetate. In the preferred embodiment, the polyvinyl alcohol comprises at least 80% hydrolyzed polyvinyl acetate at the time of addition to the emulsion system. Hydrolysis of the acetate may continue after mixing the alcohol composition into the formulation. The polyvinyl alcohol provides emulsion stability as well as increased stability in the gypsum slurry while providing superior water repellency in the final gypsum product. The combination of polyvinyl alcohol with the blend of wax, alkyl acid and/or ester provides water repellent properties which are significantly better than either component when used alone.

To further improve the overall properties of this invention there may be added secondary emulsifiers and stabilizers to the components (a) to (c). Suitable emulsifiers may be any one of a broad class of nonionic, cationic and anionic emulsifiers, the nonionic emulsifiers preferably having a hydrophile lipophile balance (HLB) in the range of 4 to 12. As a stabilizer, any water soluble alkali compound can be used, such as metal hydroxides or carbonates, ammonium hydroxide and amines such as mono, di and tri-ethanolamine.

An optimum formulation can be arrived at which will provide excellent stability, gypsum fluidity and water repellency as in the following example with general and preferred ranges. The components are listed in relative parts by weight based on 100 parts of hydrocarbon wax. Percentage by weight concentrations can be arrived at by taking the preferred range of the wax component to be in the area of 30% to 60% of the total formulation.

The preferred ranges for each component, in summary, are:

| Component | Parts by Weight | |
| --- | --- | --- |
|  | General | Preferred |
| Hydrocarbon wax | 100 | 100 |
| $C_{22}$–$C_{32}$ acid | 0.01 to 50 | 0.1 to 5 |
| di-ester of $C_{22}$–$C_{32}$ acid | 0 to 50 | 0 to 10 |
| Polyvinyl alcohol | 0.5 to 50 | 1 to 20 |
| Stabilizers | 0.01 to 5 | 0.5 to 5 |

The combined level of $C_{22}$–$C_{32}$ acid and corresponding di-ester in this example would most preferably be within 1 to 15 parts per 100 parts of hydrocarbon wax. Note that the di-ester consists of approximately 90% ester and 10% unreacted acid.

Method Of Manufacture:

In a typical production process the wax, alkyl acid/esters are pre-blended in a molten state and held in a pre-blend tank. This pre-blend will then be mixed with an aqueous solution containing the polyvinyl alcohol, emulsifiers and stabilizers using conventional mixing or milling techniques. The aqueous solution is heated such that the temperature of the mixture remains above the melt point of the wax pre-blend long enough to form the emulsion. Heating of the aqueous solution may occur before or during addition of the polyvinyl alcohol and other components, or after the addition is complete. The emulsion is then cooled rapidly to form a stable wax emulsion.

The resulting emulsion is typically white or cream coloured and the pre-blend tank is free of residues or fallout materials which are typical when using asphalt materials or crude montan waxes.

Application Or Use Of Emulsion With Gypsum:

The water resistance of gypsum products can be greatly improved through the addition of said wax emulsion to a slurry consisting of calcined gypsum, water, and any accelerators, retarders, foaming agents, etc., which may be required depending upon the application. The gypsum slurry is allowed to set through hydration and is dried using conventional methods. The resulting gypsum product will have far superior water repellency when compared to typical asphalt wax formulations or conversely will provide equivalent performance at a much reduced use rate. The emulsion will also not cause discolouration of the gypsum as will asphalt or crude montan waxes.

EXAMPLE OF TEST DATA

The present invention will be further explained and illustrated by the following comparative examples and test results. These examples are intended to describe the advantageous properties of this invention and not to limit the invention in any way.

Various comparative samples were prepared using a paraffin wax and a polyvinyl alcohol, comprising a partially hydrolyzed polyvinyl acetate, in combination with:

an alkyl acid comprised essentially of octacosanoic acid without any ester a di-ester of said alkyl acid a 1:2 blend of the previous two components respectively These samples were then compared using the outlined test procedures for slurry fluidity stability and water repellency and were further compared with montan wax, polyvinyl alcohol and polyvinyl alcohol-free samples where relevant.

Sample Preparations:
Sample Preparation # 1
Alkyl acid

| component | parts by weight |
|---|---|
| paraffin wax | 351 |
| octacosanoic acid | 20 |
| polyvinyl alcohol | 14 |

Sample Preparation # 2
Alkyl ester

| component | parts by weight |
|---|---|
| paraffin wax | 351 |
| di-ester of octacosanoic acid | 20 |
| polyvinyl alcohol | 14 |

Sample Preparation # 3
Acid/ester blend

| component | parts by weight |
|---|---|
| paraffin wax | 351 |
| octacosanoic acid | 6.7 |
| di-ester of octacosanoic acid | 13.3 |
| polyvinyl alcohol | 14 |

Sample Preparation # 4
Acid/ester—no polyvinyl alcohol

| component | parts by weight |
|---|---|
| paraffin wax | 466 |
| octacosanoic acid | 6.7 |
| di-ester of octacosanoic acid | 13.3 |

Sample Preparation # 5
Montan wax

| component | parts by weight |
|---|---|
| paraffin wax | 351 |
| montan wax | 20 |
| polyvinyl alcohol | 14 |

Comparative Tests:
Fluidity of gypsum stucco

In order to demonstrate the effect of alkyl acids and esters on the fluidity of stucco, the following procedure was employed:

100 g of calcined gypsum was mixed with a water solution containing 1.5 parts by weight of emulsion solids. The resulting slurry was allowed to soak for 30 seconds, then mixed at 120 rpm for a period of 1 minute, and finally poured onto a 12"×12" glass plate at the 2 minute interval. The diameter of the resulting gypsum patty was then measured. A larger diameter patty is indicative of improved flow and consistency of the gypsum slurry. The results of this test are as follows:

Comparative Test Example #1

The following table demonstrates the results of the fluidity test described above using two stuccos from different sources. Results are expressed as a percentage and are calculated by the formula:

(diameter of gypsum patty with emulsion/diameter of gypsum patty without emulsion)×100

| Sample # | Description | Stucco #1 | Stucco #2 |
|---|---|---|---|
| 1 | Alkyl acid | 81.5% | 96.2% |
| 2 | Di-ester | 110.0% | 106.5% |
| 1 plus 2 | 1:1 blend | 83.3% | 105.5% |

These results indicate a reduced fluidity in both cases for the alkyl acid sample and an improved fluidity in both cases for the di-ester as compared to no emulsion at all. The 1:1 blend, however, shows a reduction in fluidity for stucco source #1 but an improved fluidity for stucco #2. An optimum formulation would therefore require a different balance of acid to ester for these two stuccos.

Emulsion Stability

Emulsion stability was determined by placing 100 ml of test emulsions in a graduated cylinder and measuring the amount of separation or creaming of the emulsion occurring with time. The emulsion separation was defined to be the amount of aqueous material which was severely depleted or completely free of any of the dispersed phase of the emulsion. Samples of the alkyl acid, di-ester, and acid/ester blend were compared to a similar emulsion in which montan wax had been substituted for the aforementioned components. The results can be summarized as follows:

Comparative test Example #2

| | | Degree of Separation | | |
|---|---|---|---|---|
| Sample # | Description | 48 hrs | 5 days | 7 days |
| 1 | alkyl acid | 0% | 0% | 0% |
| 2 | Di-ester | 6% | 13% | 15% |
| 3 | acid/ester | 0% | 0% | 0% |
| 5 | montan wax | 8% | 16% | 17.5% |

Sample numbers correspond to the previously outlined sample preparations. The results clearly demonstrate an improved stability of both the alkyl acid and acid/ester blends over the montan wax and the di-ester when used alone. Improved stability of the emulsion allows for the storage of aqueous emulsion with only periodic usage typical of many wallboard producing facilities. The absence of any phase separation translates into consistency of performance characteristics over time.

Water Repellency:

In order to demonstrate the synergistic effects of the wax, alkyl acid/alkyl ester, and the polyvinyl alcohol with respect to the water repellency of the final gypsum material, comparative examples 3 (with pva) and 4 (without pva) were tested against polyvinyl alcohol alone and a control sample containing only gypsum stucco and water.

The test samples were prepared by incorporating 5.38 parts of wax emulsion into a gypsum slurry containing 140 parts gypsum stucco and 106 parts water. The entire mixture was stirred at 180 rpm for a period of 1 minute and then poured into a 2"×2"×2" cubic mold and allowed to set. Once set, the sample was placed into a forced air oven at a temperature of 185° C. for a period of 55 minutes. The sample was then removed from the oven and conditioned at ambient temperature for an additional 18 hours.

The conditioned samples were then placed into a 21° C. water bath and the percentage of water absorbed was calculated by the following formula:

$$\left\{\frac{(IW - FW)}{IW}\right\} \times 100\%$$

where IW is the initial weight of the conditioned sample and FW is the final weight after a 2 hour soak in the water bath.

The results can be tabulated as follows:

| Sample | Parts by Weight | | | | | |
|---|---|---|---|---|---|---|
| | gypsum | alkyl acid | alkyl ester | Paraffin | pva | Absorption |
| Control | 140 | 0 | 0 | 0 | 0 | 46.3% |
| #3 | 140 | .036 | .072 | 1.89 | .075 | 0.85% |
| #4 | 140 | .030 | .061 | 2.13 | 0 | 16.8% |
| Pva | 140 | 0 | 0 | 0 | 2.07 | 33.3% |

These results illustrate the dramatic effect of combining polyvinyl alcohol with the paraffin wax/alkyl acid/alkyl ester blend. The specific compositions used in this and other examples are not meant to limit the scope of the invention in any way but are meant rather to illustrate the excellent properties which can be attained with respect to emulsion stability, fluidity of the gypsum slurry and water repellency of gypsum products. Through careful manipulation of the various components of this invention an optimum emulsion formulation can be achieved in a novel manner for the gypsum industry.

In a subsequent test, the water repellency of Samples 1, 2 and a blend of 1 and 2, was determined using the same procedure as described above. The results of the test are shown below.

| Sample # | Description | Water Absorption |
|---|---|---|
| 1 | Alkyl acid | 6.8% |
| 2 | Di-ester | 10.1% |
| 1 plus 2 | 1:1 blend | 8.7% |

It is interesting to note that the water absorption percentage of the 1:1 blend of the alkyl acid and di-ester samples (which contain equal amounts of octacosanoic acid and the di-ester of octacosanoic acid) is approximately mid-way between the water absorption percentages for the alkyl acid sample and the di-ester sample.

Although the invention has been described with reference to certain specific embodiments, various modifications thereof will be apparent to those skilled in the art without departing from the spirit and scope of the invention.

We claim:

1. A water-based wax emulsion formulation for imparting water repellent characteristics to gypsum wall boards consisting essentially of:
   a) hydrocarbon wax;
   b) an alkyl acid and/or alkyl ester wherein the alkyl acid and/or alkyl ester has a carbon chain length greater than $C_{18}$; and
   c) a polyvinyl alcohol composition comprising hydrolyzed polyvinyl acetate.

2. The water-based wax emulsion formulation according to claim 1, wherein the hydrocarbon wax has a melting point in the range of 40–110° C.

3. The water-based wax emulsion formulation according to claim 1, wherein the hydrocarbon wax is a petroleum fraction wax.

4. The water-based wax emulsion formulation according to claim 1, wherein the hydrocarbon wax is a paraffin wax.

5. The water-based wax emulsion formulation according to claim 1, wherein the polyvinyl alcohol comprises at least 80% hydrolyzed polyvinyl acetate.

6. The water-based wax emulsion formulation according to claim 1, wherein the alkyl acid and/or alkyl ester is derived from fatty acids having carbon chain lengths greater than $C_{18}$.

7. The water-based wax emulsion formulation according to claim 1, wherein the alkyl acid has a carbon chain length of $C_{26}$ to $C_{46}$.

8. The water-based wax emulsion formulation according to claim 1, wherein the alkyl acid is octacosanoic acid.

9. The water-based wax emulsion formulation according to claim 1, wherein the alkyl ester is a di-ester of octacosanoic acid with ethylene glycol.

10. The water-based wax emulsion formulation according to claim 1, further comprising a secondary emulsifier selected from the group consisting of nonionic, cationic and anionic emulsifiers.

11. The water-based wax emulsion formulation according to claim 10, wherein the secondary emulsifier is a nonionic emulsifier having a hydrophile lipophile balance in the range of 4 to 12.

12. The water-based wax emulsion formulation according to claim 1, further comprising a stabilizer selected from the group consisting of water soluble alkali metal hydroxides and carbonates, ammonium hydroxide and amines.

13. The water-based wax emulsion formulation according to claim 1, comprising: 100 parts by weight hydrocarbon wax; 0.01 to 50 parts by weight of a $C_{22}$–$C_{32}$ alkyl acid; 0 to 50 parts by weight a di-ester of a $C_{22}$–$C_{32}$ alkyl acid; 0.5 to 50 parts by weight polyvinyl alcohol; and 0.01 to 5 parts by weight of a stabilizer.

14. The water-based wax emulsion formulation according to claim 1, comprising an alkyl acid and a di-ester of the alkyl acid in a parts by weight ratio of about 1:2.

15. A method for the production of a water-based wax emulsion comprising the steps of:
   (i) blending a hydrocarbon wax and an alkyl acid and/or alkyl ester in a molten state to form a wax blend;
   (ii) solubilizing polyvinyl alcohol in water to form an aqueous solution;

(iii) mixing the wax blend and the aqueous solution at a temperature above the melt point of the wax blend to form an emulsion; and (iv) cooling the emulsion to form a stable wax emulsion.

16. The method according to claim 15, further comprising adding an emulsifier and/or a stabilizer to the water in step (ii).

17. A water-based wax emulsion formulation for imparting water repellency to gypsum comprising:

a) a hydrocarbon wax;

b) an alkyl acid and/or alkyl ester having a carbon length greater than $C_{18}$; and c) a polyvinyl alcohol composition comprising hydrolyzed polyvinyl acetate.

18. The emulsion formulation according to claim 17 wherein the hydrocarbon wax is chosen from the group consisting of:

a) a wax having a melting point in the range of 40° to 110° C.;

b) a petroleum fraction wax; and c) a paraffin wax.

19. The emulsion formulation according to claim 17 wherein the alkyl acid has a carbon chain length of $C_{26}$ and $C_{46}$.

20. A water-based wax emulsion formulation for imparting water repellent characteristics to gypsum wall boards consisting essentially of:

a) hydrocarbon wax;

b) an alkyl acid and/or alkyl ester;

c) a polyvinyl alcohol composition comprising hydrolyzed polyvinyl acetate; and d) a secondary emulsifier selected from the group consisting of nonionic, cationic and anionic emulsifiers.

21. A water-based wax emulsion formulation for imparting water repellent characteristics to gypsum wall boards consisting essentially of:

a) hydrocarbon wax;

b) an alkyl acid and alkyl ester, wherein the ester is a di-ester of the alkyl acid and the acid and di-ester are in a weight ratio of about 1:2; and c) a polyvinyl alcohol composition comprising hydrolyzed polyvinyl acetate.

* * * * *